(12) United States Patent
Yoshida

(10) Patent No.: US 11,928,334 B2
(45) Date of Patent: Mar. 12, 2024

(54) APPARATUS CONTROLLER AND APPARATUS CONTROL SYSTEM

(71) Applicant: Mitsubishi Electric Corporation, Tokyo (JP)

(72) Inventor: Toshiki Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 17/910,678

(22) PCT Filed: May 15, 2020

(86) PCT No.: PCT/JP2020/019441
§ 371 (c)(1),
(2) Date: Sep. 9, 2022

(87) PCT Pub. No.: WO2021/229796
PCT Pub. Date: Nov. 18, 2021

(65) Prior Publication Data
US 2023/0133155 A1 May 4, 2023

(51) Int. Cl.
*G06F 3/06* (2006.01)
(52) U.S. Cl.
CPC .......... *G06F 3/0608* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 10,437,865 B1 * | 10/2019 | Clements | G06F 16/30 |
| 10,496,670 B1 * | 12/2019 | Clements | G06F 12/109 |
| 10,621,158 B2 * | 4/2020 | Faber | G06F 16/1734 |
| 11,379,421 B1 * | 7/2022 | Ciubotariu | G06F 16/1744 |

(Continued)

FOREIGN PATENT DOCUMENTS

JP 2014-017542 A 1/2014

OTHER PUBLICATIONS

International Search Report of the International Searching Authority dated Jun. 30, 2020 in corresponding International Patent No. PCT/JP2020/019441 (with English translation).

*Primary Examiner* — Kevin Verbrugge
(74) *Attorney, Agent, or Firm* — POSZ LAW GROUP, PLC

(57) ABSTRACT

An apparatus controller includes a first communication module, a storage module, a data processing module, and a controller. The first communication module receives from each of one or more apparatuses, operation information indicating the operation state of the apparatus. The storage module stores the operation information in a cumulative manner. The data processing module combines, when values indicated by a plurality of operation information pieces successively received from the apparatus by the first communication module are equal to each other, the plurality of operation information pieces, thereby producing combined operation information. The controller causes, when the data processing module produces the combined operation information, the storage module to store the combined operation information instead of the plurality of operation information pieces.

17 Claims, 12 Drawing Sheets

(56) References Cited

U.S. PATENT DOCUMENTS

| | | | |
|---|---|---|---|
| 2010/0077013 A1* | 3/2010 | Clements | G06F 16/1748 |
| | | | 707/822 |
| 2010/0125707 A1* | 5/2010 | Cypher | G06F 9/30087 |
| | | | 711/E12.017 |
| 2010/0153655 A1* | 6/2010 | Cypher | G06F 9/3851 |
| | | | 711/139 |
| 2010/0174863 A1* | 7/2010 | Cooper | G06F 16/27 |
| | | | 707/610 |
| 2012/0066694 A1* | 3/2012 | Jennings | G06F 9/542 |
| | | | 719/318 |
| 2015/0185720 A1 | 7/2015 | Kazuno et al. | |
| 2019/0042616 A1* | 2/2019 | Faber | G06F 16/2358 |
| 2022/0308548 A1* | 9/2022 | Okada | G05B 19/054 |
| 2023/0113180 A1* | 4/2023 | Srinivasan | G06F 11/0709 |
| | | | 714/100 |

* cited by examiner

FIG. 4

Related Art

| ADDRESS | 1 | 1 | 1 | 1 |
|---|---|---|---|---|
| DATE AND TIME | YY/ZZ/20XX 1:00 | YY/ZZ/20XX 2:00 | YY/ZZ/20XX 3:00 | YY/ZZ/20XX 4:00 |
| VALUE | 100 | 100 | 100 | 120 |

FIG. 5

| ADDRESS | 1 | 1 |
|---|---|---|
| FIRST DATE AND TIME | YY/ZZ/20XX 1:00 | YY/ZZ/20XX 4:00 |
| LAST DATE AND TIME | YY/ZZ/20XX 3:00 | NULL |
| VALUE | 100 | 120 |

FIG. 8

| ADDRESS | 1 |
|---|---|
| FIRST DATE AND TIME | YY/ZZ/20XX 1:00 |
| LAST DATE AND TIME | YY/ZZ/20XX 24:00 |
| VALUE | 100 |

FIG. 9

| ADDRESS | 1 |
|---|---|
| FIRST DATE AND TIME | 4/1/20XX 1:00 |
| LAST DATE AND TIME | 4/30/20XX 24:00 |
| VALUE | 100 | ant
APPARATUS CONTROLLER AND APPARATUS CONTROL SYSTEM

CROSS-REFERENCE TO RELATED APPLICATION

This application is a U.S. National Stage Application of International Application No. PCT/JP2020/019441 filed on May 15, 2020, the contents of which are incorporated herein by reference.

TECHNICAL FIELD

The present disclosure relates to an apparatus controller and an apparatus control system that control an apparatus.

BACKGROUND

In the past, apparatus controllers that control an apparatus or apparatuses such as air-conditioning apparatuses have been known (for example, see Patent Literature 1). In such an apparatus controller as described above, in many cases, data pieces indicating respective daily operation states of an apparatus are accumulated in a nonvolatile memory. In such a case, also in many cases, the amount of data stored in the memory corresponds to the product of data sizes for respective items, the numbers of times data is acquired for the respective items, and the number of apparatuses. Thus, in the case where many apparatuses are to be controlled, the apparatus controller needs a memory having a large storage capacity.

PATENT LITERATURE

Patent Literature 1 Japanese Unexamined Patent Application Publication No. 2014-17542

However, a nonvolatile memory having a large capacity is not necessarily used in the apparatus controller. Thus, the apparatus controller may run out of the storage capacity because of accumulation of data.

SUMMARY

The present disclosure is applied to solve the above problem and relates to an apparatus controller and an apparatus control system that maintain a storage capacity by reducing the amount of data to be stored.

An apparatus controller according to an embodiment of the present disclosure includes: a first communication module configured to receive from each of one or more apparatuses, an operation information piece indicating an operation state of the apparatus; a storage module configured to store the operation information piece in a cumulative manner; a data processing module configured to produce, when values indicated by a plurality of operation information pieces that are successively received from the apparatus are equal to each other, combined operation information that is a combination of the plurality of operation information pieces; and a controller configured to control the first communication module and the data processing module and also cause, when the data processing module produces the combined operation information, the storage module to store the combined operation information instead of the plurality of operation information pieces.

An apparatus control system according to an embodiment of the present disclosure includes one or more apparatuses, one or more external devices, and an apparatus controller configured to control each of the one or more apparatuses. The apparatus controller includes a first communication module, a storage module, a data processing module, a second communication module, and a controller. The first communication module is configured to receive from each of the one or more apparatuses, an operation information piece indicating an operation state of the apparatus. The storage module is configured to store the operation information piece in a cumulative manner. The data processing module is configured to produce, when values indicated by a plurality of operation information pieces that are successively received from the apparatus by the first communication module are equal to each other, combined operation information that is a combination of the plurality of operation information pieces. The second communication module is configured to communicate with the one or more external devices. The controller is configured to control the first communication module, the data processing module, and the second communication module. The one or more external devices receive an operation information piece from the apparatus controller and store the operation information piece. The controller is configured to cause at least one of the one or more external devices and the storage module to store the combined operation information instead of the plurality of operation information pieces, when the data processing module produces the combined operation information.

In the apparatus controller and the apparatus control system according to embodiments of the present disclosure, in the case of successively receiving a plurality of operation information pieces indicating values equal to each other, from an apparatus or from each of apparatuses, the apparatus controller combines the plurality of operation information pieces into combined operation information. The apparatus controller causes the apparatus controller or at least one of the apparatus controller and one or more external devices to store the combined operation information instead of the plurality of operation information pieces. Thus, the amount of data to be stored is reduced, whereby the storage capacity can be maintained.

BRIEF DESCRIPTION OF DRAWINGS

FIG. 4 is a diagram illustrating an operation information piece stored according to an existing method.

FIG. 5 is a diagram illustrating accumulated operation information that is obtained by a data processing module according to the embodiment after the amount of operation information is reduced.

FIG. 8 is a diagram illustrating an example of accumulated operation information stored by the apparatus controller which acquires an operation information indicating the energy consumption as indicated in FIG. 7.

FIG. 9 is a diagram indicating an example of accumulated operation information that is stored in a storage module in the case where the state of the apparatus does not change for a long period of time.

DETAILED DESCRIPTION

An apparatus controller 2 and an apparatus control system 100 according to an embodiment will be described in detail with reference to the drawings. It should be noted that in each of figures that will be referred to, relationships in size between components may be different from those between actual ones.

Embodiment

Figure 1:
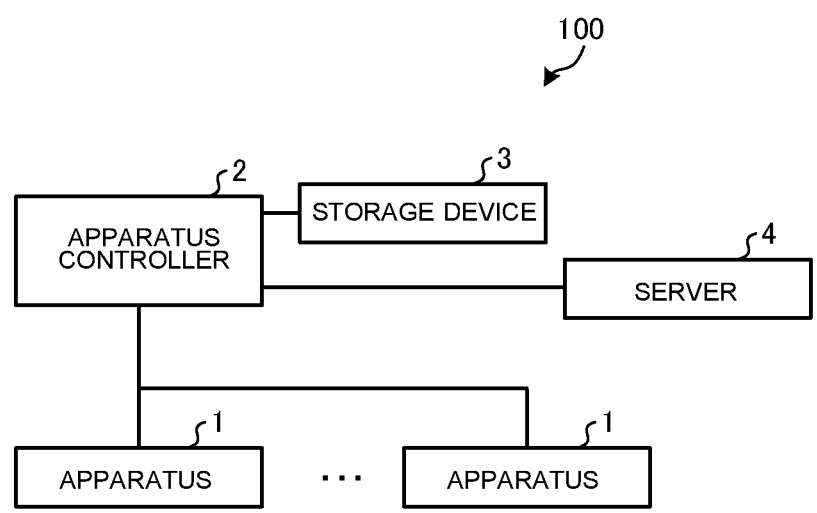
FIG. 1 is a diagram illustrating a configuration of an apparatus control system according to an embodiment.

FIG. 1 is a diagram illustrating an example of a configuration of an apparatus control system according to an embodiment. The apparatus control system 100 includes one or more apparatuses 1, the apparatus controller 2, a storage device 3, and a server 4. The apparatus 1 or the apparatuses 1 are each, for example, an air-conditioning apparatus, a display apparatus, or an illumination apparatus. The following description is made on the assumption that each of the one or more apparatuses 1 is an air-conditioning apparatus.

The apparatus controller 2 is an apparatus that a user uses to monitor and operate each of the one or more apparatuses 1. The apparatus controller 2 controls the apparatus 1. The apparatus controller 2 acquires, from the apparatus 1, an operation information piece indicating the operation state of the apparatus 1. As the operation information piece, for example, energy consumption, the volume of air, or a set temperature is present.

The storage device 3 is a nonvolatile storage device provided outside the apparatus controller 2. The storage device 3 is, for example, a universal serial bus (USB) memory or a flash memory such as a secure digital (SD) memory card. Alternatively, the storage device 3 may be a magnetic disk such as a hard disk or may also be an optical disc such as a compact disc (CD). In the following, it is assumed that the storage device 3 is a flash memory; however, it may be possible for the user to replace the flash memory with a memory having a larger storage capacity.

The server 4 is, for example, a cloud server, a hard disk drive (HDD), or a solid state drive (SSD). The server 4 is a device that has a data storage area which the apparatus controller 2 can access via the Internet. In the server 4, various data on the apparatus controller 2 is stored. It should be noted that that the storage device 3 and the server 4 are each an example of an external device.

The apparatus controller 2 may store an operation information piece regarding each of the one or more apparatuses 1 or may cause the storage device 3 or the server 4 to store the entire operation information piece regarding the apparatus 1 or part of the operation information piece. Instead of or together with the apparatus controller 2, the storage device 3 and the server 4 store the entire operation information piece regarding the apparatus 1 or part of the operation information piece.

Figure 2:
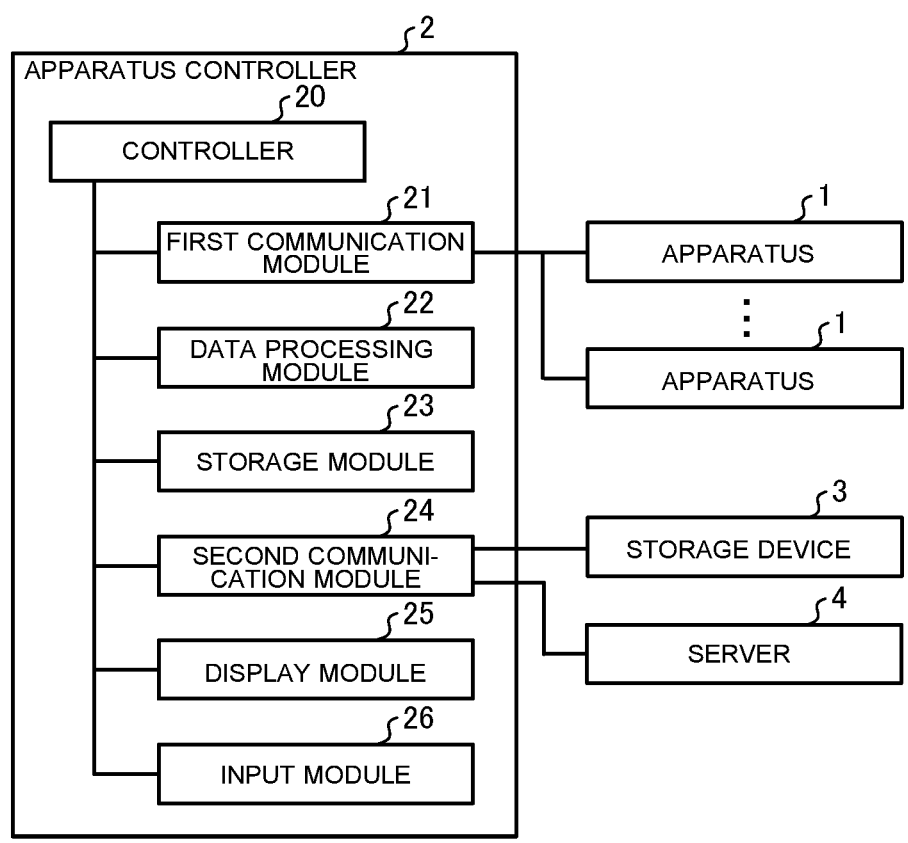
FIG. 2 is a diagram illustrating functional blocks of an apparatus controller.

The apparatus controller 2 according to the embodiment will be described. FIG. 2 is a diagram illustrating functional blocks of the apparatus controller. The apparatus controller 2 includes a controller 20, a first communication module 21, a data processing module 22, a storage module 23, a second communication module 24, a display module 25, and an input module 26. Referring to FIG. 2, lines connecting these modules are signal lines; however, connection relationships between these modules are not limited to those as indicated in FIG. 2.

The controller 20 controls the first communication module 21, the data processing module 22, the second communication module 24, and the display module 25. The first communication module 21 transmits and receives various information to and from each of the apparatuses 1 in response to a command from the controller 20. The first communication module 21 acquires an operation information piece from the apparatus 1. It should be noted that as described above, the operation information piece is information indicating an operation state. The operation state may be indicated by various indexes such as energy consumption, throughput, rotation speed, set temperature, volume of air, etc. In the embodiment, one or more indexes to be monitored by the apparatus controller 2 are each itemized. In the following, each of the itemized indexes may also be referred to as a data item. The first communication module 21 according to the embodiment acquires an operation information piece on a data item basis. In the following, it is assumed that the operation information piece means information indicated on a data item basis.

The first communication module 21 periodically acquires an information piece in response to a command from the controller 20. It should be noted that regarding each of the data items, a time interval from time at which the first communication module 21 acquires an operation information piece regarding the data item to time at which the first communication module 21 acquires a subsequent operation information piece regarding the data item is determined depending on the data item. The time interval is, for example, 30 minutes or 1 hour.

The data processing module 22 performs, in response to a command from the controller 20, processing using the operation information piece acquired by the first communication module 21. The operation information piece includes a value of an index indicating the operation state of the apparatus 1. The value of the index indicating the operation state will be merely referred to as a value. The data processing module 22 may use the value acquired from the apparatus 1 as it is;
however, the data processing module 22 may also use, for example, a decimal value into which the value indicated by a hexadecimal number is converted.

The data processing module 22 adds to the operation information piece, the date and time at which the operation information piece was received and identification information on the apparatus 1. It should be noted that the identification information on the apparatus 1 is used to distinguish the apparatus 1 from the other apparatus or the other apparatuses 1, and is, for example, the address or apparatus number of the apparatus 1.

The storage module 23 is a nonvolatile storage device incorporated in the apparatus controller 2. The controller 20 causes the storage module 23 to store various data. The controller 20 causes the storage module 23 to store, in a cumulative manner, the operation information piece processed by the data processing module 22.

The second communication module 24 enables the apparatus controller 2 and the storage device 3 and the server 4 to communicate with each other. The second communication module 24 communicates with at least one of the storage device 3 and the server 4 in response to a command from the controller 20. Through the second communication module 24, the controller 20 causes at least one of the storage device 3 and the server 4 to store data, and reads out data from at least one of the storage device 3 and the server 4. The controller 20 may cause, instead of or together with the storage module 23, at least one of the storage device 3 and the server 4 to store the operation information piece processed by the data processing module 22.

The display module 25 displays information on a screen thereof in response to a command from the controller 20. The input module 26 receives a command input by the user.

In many cases, the storage capacity of the storage module 23 is smaller than that of each of the storage device 3 and the server 4. In the case where operation information pieces from each of the one or more apparatuses 1 are stored in the storage module 23 in a cumulative manner, the storage module 23 may run out of storage capacity. Whether the storage module 23 runs out of storage capacity or not depends on, for example, the number of apparatuses 1 in the apparatus control system 100 or the amount of the operation information.

The controller 20 according to the embodiment causes the data processing module 22 to perform a process to reduce the amount of the operation information in order to prevent the storage module 23 from running out of storage capacity. It will be described with reference to FIGS. 3 to 5 how the data processing module 22 reduces the amount of the operation information.

Figure 3:
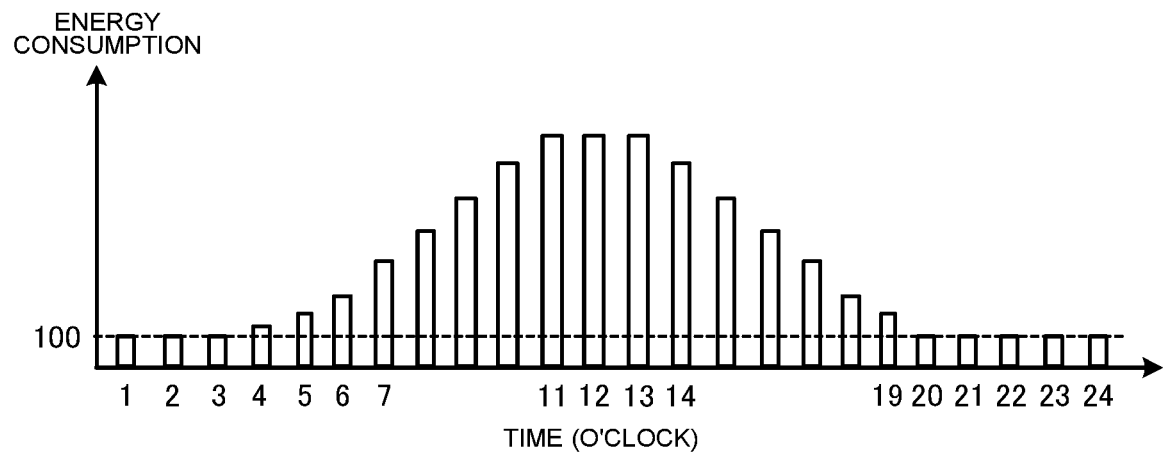
FIG. 3 is a diagram indicating temporal transition of an operation information piece acquired from an apparatus or apparatuses.

FIG. 3 is a diagram illustrating temporal transition of an operation information piece acquired from the apparatus or each of the apparatuses. It will be described by referring to by way of example the case where hourly energy consumption is an operation information piece. The apparatus controller 2 hourly acquires an operation information piece indicating energy consumption from the apparatus 1 or each of the apparatuses 1. Referring to FIG. 3, the energy consumptions at 1:00, 2:00, and 3:00 are each 100 [kWh] and are equal in value to each other. The energy consumption continuously increases in a time period from 4:00 to 11:00. The energy consumptions at 11:00, 12:00, and 13:00 are equal in value to each other and correspond to peak values in a day. The energy consumption decreases in a time period from 14:00 to 19:00. Furthermore, the energy consumptions at 20:00, 21:00, 22:00, 23:00, and 24:00 are equal in value to each other and are 100 [kWh].

FIG. 4 is a diagram indicating an operation information piece stored according to an existing method. Operation information pieces are stored in a cumulative manner as described above. In the following, the operation information pieces stored in a cumulative manner may also be referred to as accumulated operation information. The accumulated operation information as illustrated in FIG. 4 includes an operation information piece that is acquired from an apparatus 1 whose address is 1, in a time period from 1:00 to 4:00, YY (month) ZZ (day), 20XX (year). It should be noted that the operation information piece indicates the energy consumption as indicated in FIG. 3. Moreover, "value" in FIG. 4 corresponds to the value of energy consumption.

Items in the accumulated operation information as indicated in FIG. 4 are address, date and time, and value, and the number of the items is three. The accumulated operation information as indicated in FIG. 4 includes records indicating the values of four operation information pieces acquired from the apparatus 1 whose address is 1. Each of the records includes an associated one of a data value at 1:00, a data value at 2:00, a data value at 3:00, and a data value at 4:00. The storage capacity necessary for storing the accumulated operation information corresponds to the product of the number of items and the number of records. In the case as indicated in FIG. 4, 3×4=12.

FIG. 5 is a diagram indicating accumulated operation information that is obtained by the data processing module according to the embodiment after the amount of the operation information is reduced. As in the case as indicated in FIG. 4, the accumulated operation information as indicated in FIG. 5 also includes an operation information piece indicating the energy consumption as indicated in FIG. 3 and acquired from the apparatus 1 whose address is 1, in the time period from 1:00 to 4:00, YY (month) ZZ (day), 20XX (year).

Referring to FIG. 4, each time an operation information piece is acquired, a record in which the address of the apparatus 1 and the date and time are added to the operation information piece is added to the accumulated operation information. However, when the apparatus controller 2 according to the embodiment successively receives from one apparatus 1, a plurality of operation information pieces that indicate values equal to each other, the apparatus controller 2 combines the plurality of operation information pieces into a single record and then stores the record. Hereinafter, the record may also be referred to as an operation information piece, and the single record into which the plurality of operation information pieces are combined may also be referred to as combined operation information.

The apparatus controller 2 adds, as the first date and time, the reception date and time of a first one of a plurality of operation information pieces successively received from the one apparatus 1 and indicating values equal to each other to a record including the value. Moreover, the apparatus controller 2 adds, as the last date and time, the reception date and time of a last one of the plurality of operation information pieces to the record. Subsequently, when the apparatus controller 2 further receives from the apparatus 1, an operation information piece that indicates a value equal to the values indicated by the above plurality of operation information pieces, the apparatus controller 2 rewrites the last date and time to determine the reception date and time of the operation information piece as the last date and time. Also, thereafter, even when the apparatus controller 2 receives an operation information piece from the apparatus 1, as long as the value indicated by the operation information piece is equal to the values indicated by the above plurality of operation information pieces, the total number of records in the accumulated operation information remains unchanged.

As indicated in FIG. 5, the items of the accumulated operation information according to the embodiment include the address of apparatus 1, the value, the first date and time, and the last date and time. In the accumulated operation information as indicated in FIG. 5, "20XX/YY/ZZ 1:00" that corresponds to the date and time at which the apparatus controller 2 acquired, for the first time, an operation information piece indicating 100 [kWh] as the value, from the apparatus 1 whose address is 1 is set as the first date and time in a record including the value. As illustrated in FIG. 3, the value acquired by the apparatus controller 2 is kept at 100 from 1:00 to 3:00 and is 120 at 4:00. Thus, "20XX/YY/ZZ 3:00" that corresponds to the date and time at which the apparatus controller 2 lastly acquired operation information piece indicating 100 [kWh] as the value from the apparatus 1 is set as the last date and time in the record.

In an example as indicated in FIG. 5, the date and time at which the apparatus controller 2 lastly received an operation information piece from the apparatus 1 whose address is 1 is written as 4:00, YY (month) ZZ (day), 20XX (year). The apparatus controller 2 receives an operation information piece indicating 120 [kWh], which is different from a previous value of 100 [kWh], from the apparatus 1 at 4:00. Thus, in the accumulated operation information as indicated in FIG. 5, a record including a value of 120 [kWh] is added to the record including a value of 100 [kWh]. "20XX/YY/ZZ 4:00" that corresponds to the date and time at which the apparatus controller 2 received, for the first time, an operation information piece indicating 120 [kWh] as the value is set as the first date and time in the record including a value of 120 [kWh]. At this time, the first date and time is the same as the date and time at which the operation information piece indicating 120 [kWh] as the value was lastly received. Thus, in the record including the value of 120 [kWh], "NULL" is set as the last date and time. However, instead of "NULL", the date and time that is the same das the first date and time, or an initial value, for example, "0", is set as the last date and time.

As indicated in FIG. 5, when the apparatus controller 2 according to the embodiment receives a value that is equal to the last value, from the apparatus 1 which sends the last value, the apparatus controller 2 does not add a new record including the value to the accumulated operation information. Instead, the apparatus controller 2 rewrites the last date and time to change it from a previous date and time to a current date and time. It should be noted that the previous date and time is the date and time at which the apparatus controller 2 received the value from the apparatus 1 previous time, and the current date and time is the date and time at which the apparatus controller 2 has received the value from the apparatus 1 this time. Since the last date and time is rewritten in the above manner, the number of records regarding the apparatus 1 remains unchanged as long as the value indicated by an operation information piece received from an apparatus 1 is equal to that of an operation information piece previously received from the apparatus 1. Referring to FIG. 5, the number of items is four and larger than that in the related art as indicated in FIG. 4; however, the number of records is two and smaller than that in the related art. Thus, the storage capacity necessary for storing the accumulated operation information as indicated in FIG. 5 is a storage capacity corresponding to 4×2=8 and is smaller than that in the related art.

The data processing module 22 combines a plurality of operation information pieces that are successively received from the same apparatus 1 and indicate values equal to each other. The controller 20 adds the operation information pieces processed by the data processing module 22 to the accumulated operation information in the storage module 23. In the case where the data processing module 22 combines the plurality of operation information pieces, the controller 20 causes combined operation information obtained by combining the plurality of operation information pieces, instead of the plurality of operation information pieces, to be incorporated into the accumulated operation information. Each of processes by the data processing module 22 and the controller 20 will be described in more detail.

When the first communication module 21 acquires an operation information piece from the apparatus 1, the data processing module 22 performs the following processing in response to a command from the controller 20. The data processing module 22 reads out, from the storage module 23, the value indicated by the operation information piece received the last time from the apparatus 1. In the following, the value acquired the last time from the apparatus 1 by the apparatus controller 2 may also be referred to as a previous value, and the value acquired this time from the apparatus 1 by the apparatus controller 2 may also be referred to as a current value.

The data processing module 22 compares the current value and the previous value. In the case where the previous value is equal to the current value, the data processing module 22 rewrites the last date and time to change it from previous date and time at which a record including the previous value was received, to current date and time at which the value has been received this time. It should be noted that the record in which the last date and time is rewritten and changed from the previous date and time to the current date and time corresponds to combined operation information, which is a combination of the plurality of operation information pieces. The controller 20 causes the storage module 23 to store, instead of the record in which the last date and time has not yet been rewritten, the record in which the last date and time has been rewritten by the data processing module 22.

In contrast, in the case where the current value is different from the previous value, the data processing module 22 produces a record which includes the current value and in which the current date and time is set as the first date and time. The controller 20 causes the storage module 23 to store the record produced by the data processing module 22 such that the record is added to the accumulated operation information.

A hardware configuration of the apparatus controller 2 according to the embodiment will be described. The apparatus controller 2 can be made up of, for example, a processor such as a central processing module (CPU) or a micro processing unit (MPU), a memory such as a read only memory (ROM) or a random access memory (RAM), communication interface circuits, a display device such as a liquid crystal display or a cathode ray tube (CRT), an input device such as a keyboard or a touch panel, etc. The functions of the first communication module 21 and the second communication module 24 can each be fulfilled by the communication interface circuits. It should be noted that the second communication module 24 may include two different types of communication interface circuits. One of the two different types of communication interface circuits enables the second communication module 24 to communicate with the server 4 through the Internet, and the other enables the second communication module 24 to communicate with the storage device 3 attached externally to the apparatus controller 2. The functions of the storage module 23 can be fulfilled by the above memory. The functions of the display module 25 can be fulfilled by the above display device. The functions of the input module 26 can be fulfilled by the above input device. The functions of the controller 20 and the data processing module 22 can each be fulfilled by the processor, and to be more specific, the processor reads out, for example, various programs and data stored in the memory and executes the programs and data, thereby fulfilling the functions of the controller 20 and the data processing module 22. It should be noted that all or some of the above functions of the apparatus controller 2 may be fulfilled by a dedicated hardware device.

Figure 6:
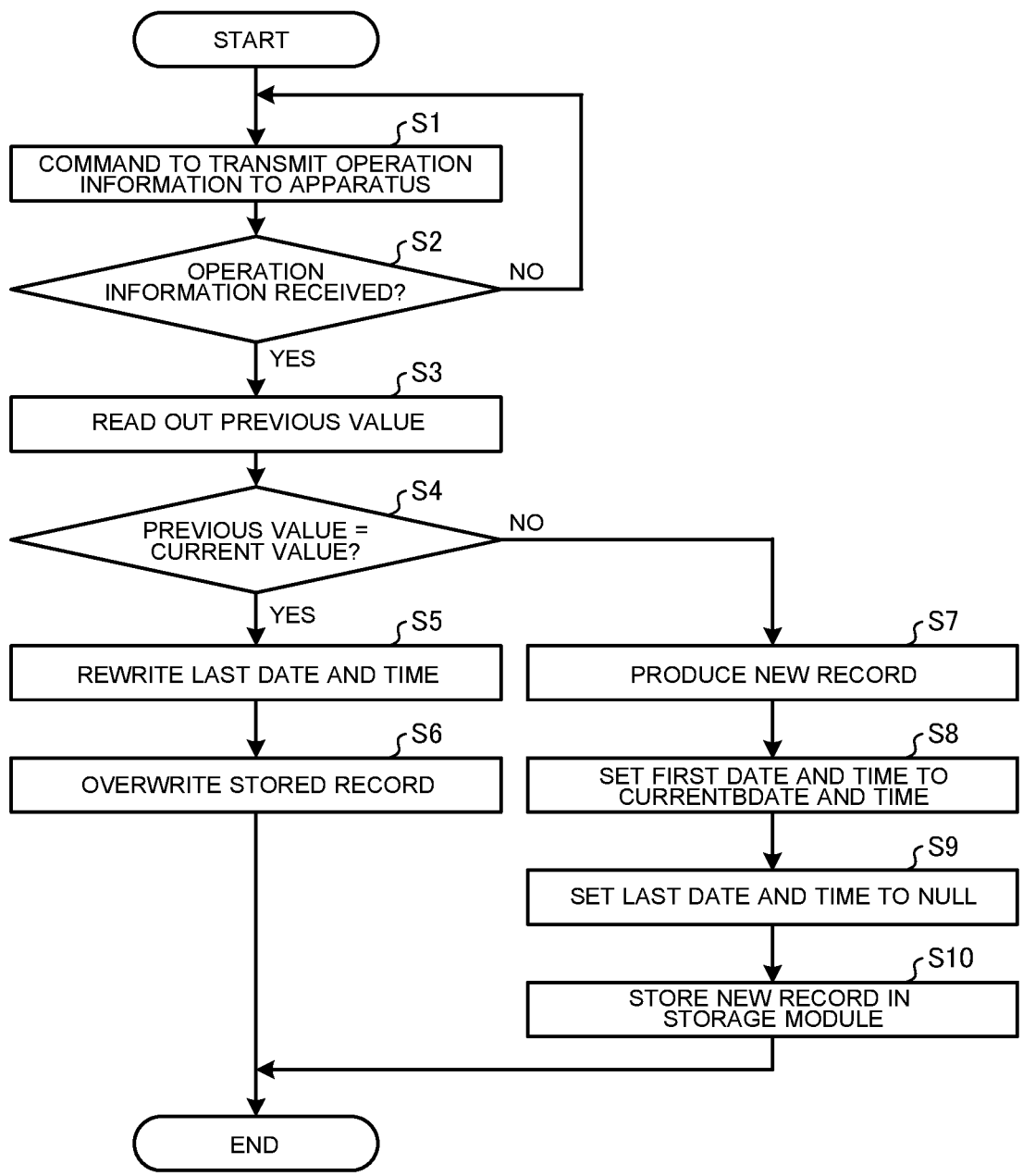
FIG. 6 is a flow chart illustrating a data storage process by the apparatus controller.

Data storage processing by the apparatus controller 2 will be described with reference to FIG. 6. FIG. 6 is a flow chart indicating an example of data storage processing by the apparatus controller. It should be noted that in order that the data storage processing be more easily understood, the following description is made with respect to the case where the apparatus controller 2 receives data from one apparatus 1 and stores accumulated operation information indicating the temporal transition of the operation state of the one apparatus 1.

In step S1, in response to a command from the controller 20, the first communication module 21 transmits, to the apparatus 1, a command to cause the apparatus 1 to transmit an operation information piece. The command is transmitted periodically. It should be noted that instead of the process of step S1, an operation information piece may be periodically and automatically transmitted from the apparatus 1 to the apparatus controller 2. After the command is transmitted, the controller 20 causes the apparatus controller 2 to be in a standby state for up to a waiting time determined in advance, until the first communication module 21 receives an operation information piece from the apparatus 1.

When the first communication module 21 does not receive an operation information piece from the apparatus 1 within the waiting time (NO in step S2), the controller 20 causes the processing to return to step S1 and controls the first communication module 21 to re-transmit the command to the apparatus 1. It should be noted that in the case where the first communication module 21 cannot receive an operation information piece from the apparatus 1 even after transmitting the command a predetermined number of times, the controller 20 may control the display module 25 to display a notification indicating that operation information cannot be received.

In step S2, when the first communication module 21 receives an operation information piece from the apparatus 1 (YES in step S2), the controller 20 causes the processing by the apparatus controller 2 to proceed to step S3. In step S3, the data processing module 22 reads out a previous value transmitted from the apparatus 1 and stored in the storage module 23.

In step S4, the data processing module 22 determines whether or not a current value is equal to the previous value. In the case where the current value is equal to the previous value (YES in step S4), in step S5, the data processing module 22 rewrites the last date and time at which a record including the previous value was received, to change it from the previous date and time to the current date and time.

In step S6, the controller 20 overwrites the record stored in the storage module 23 and including the previous value and the previous date and time, with the record in which the data processing module 22 rewrites the last date and time to change it to the current date and time. The controller 20 causes the storage module 23 to store, instead of the record including the previous value and the previous date and time, the record in which the data processing module 22 rewrites the last date and time to change it to the current date and time. After the process of step S6 ends, the apparatus controller 2 ends the data storage process.

In step S4, when the current value is different from the previous value (NO in step S4), in step S7, the data processing module 22 produces a new record including the current value.

In step S8, in the new record, the data processing module 22 sets the first date and time to the current date and time. In step S9, in the new record, the data processing module 22 sets the last date and time to "NULL". It should be noted that the data processing module 22 may set the last date and time to, for example, an initial value or the current date and time instead of "NULL".

In step S10, the controller 20 causes the storage module 23 to store the new record. In this case, the controller 20 adds the new record to the accumulated operation information stored in the storage module 23. After the process of step S10, the apparatus controller 2 ends the data storage process.

Figure 7:
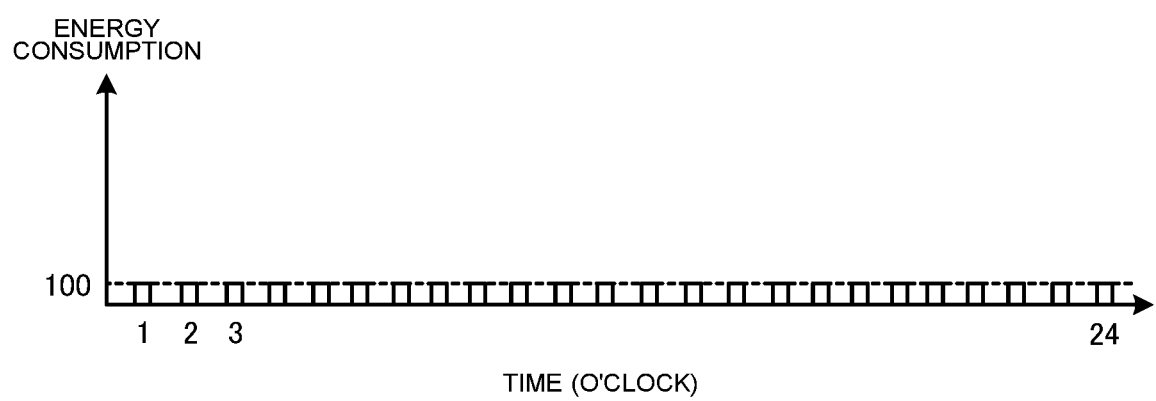
FIG. 7 is a diagram illustrating energy consumption of an apparatus which does not change over time.

It will be described by way of example how the amount of the accumulated operation information is reduced using the data storage process by the apparatus controller 2 according to the embodiment. FIG. 7 is a diagram illustrating the energy consumption of an apparatus in which does not change over time. FIG. 8 is a diagram illustrating an example of accumulated operation information stored by the apparatus controller that acquires an operation information piece indicating the energy consumption as indicated in FIG. 7. In the accumulated operation information as indicated in FIG. 8, the first date and time is set to "20XX/YY/ZZ 1:00" indicating 1:00, YY (month) ZZ (day), 20XX (year), at which the apparatus controller 2 received from the apparatus 1, for the first time, an operation information piece indicating 100 [kWh]. Moreover, in the accumulated operation information, the last date and time is set to "20XX/YY/ZZ 24:00" indicating 24:00, YY (month) ZZ (day), 20XX (year), at which the apparatus controller 2 lastly received from the apparatus 1, an operation information piece indicating 100 [kWh], which is a value unchanged from 0:00.

As illustrated in FIG. 8, the number of records in the accumulated operation information does not increase from 1 in a time period from 1:00 to 24:00 on YY (month) ZZ (day) in 20XX (year). In such a manner, in the embodiment, the amount of the accumulated operation information is reduced, and the storage module 23 can be thus prevented from running out of storage capacity.

FIG. 9 is a diagram indicating an example of the accumulated operation information stored in the storage module in the case where the state of the apparatus does not change for a long period of time. The accumulated operation information as indicated in FIG. 9 indicates that the value indicating the operation state of the apparatus 1 did not change from 100 from 1:00 on April 1 in 20XX to 24:00 on April 30 in 20XX. In the embodiment, in this example, through data indicating the state of the apparatus 1 is continuously stored for one month, the number of records is still one.

In the case where the apparatus 1 is installed in, for example, a vacant building in which no tenant rents, the state of the apparatus 1 can be unchanged over time on a monthly basis or on a yearly basis. However, as indicated in FIG. 9, in the apparatus controller 2 according to the embodiment, the amount of the accumulated operation information indicating the state of the apparatus 1 that does not change over time is reduced regardless of the time length of the time.

The data processing module 22 of the apparatus controller 2 according to the embodiment can change the data format of an operation information piece, depending on the use of the operation information piece, the data items, the accumulated operation information, etc. That is, the data processing module 22 can switch the data format of the operation information piece between an existing format and the data format of the embodiment, and store the operation information piece whose data format is changed, in the storage module 23.

It should be noted that the apparatus controller 2 can cause the storage device 3 or the server 4 as described above, as well as the storage module 23, to store the accumulated operation information. For example, the apparatus controller 2 may cause the storage module 23 to store the accumulated operation information in the data format in the embodiment and may cause the storage device 3 or the server 4 to store the accumulated operation information in the existing format. In this case, the apparatus controller 2 performs the process as indicated in FIG. 6 on an operation information piece to be stored in the storage module 23 and performs the following process on the storage device 3 or the server 4.

The data processing module 22 produces a record by adding to an operation information piece acquired through the first communication module 21, for example, the date and time at which the operation information piece was acquired and the address of an apparatus 1, which is a transmission source of the operation information piece. The controller 20 causes, through the second communication module 24, at least one of the storage device 3 and the server 4 to store the above record in a cumulative manner.

The apparatus controller 2 may cause the accumulated operation information which is to be stored in at least one of the storage device 3 and the server 4 to have the data format corresponding to the embodiment. In this case, processing by the apparatus controller 2 corresponds to processing which is referred to in the above description made with reference to FIG. 6 and in which "the storage module 23" in the description is replaced by "the storage device 3" or "the server 4". As processing other than the above processing, the apparatus controller 2 may cause the storage module 23 to store accumulated operation information in the data format corresponding to the embodiment and may cause at least one of the storage device 3 and the server 4 to store a copy of the accumulated operation information.

The apparatus controller 2 may receive an input that specifies a storage region in which an operation information is to be stored, from the user through the input module 26. In this case, the apparatus controller 2 may allow the user to specify, through the input module 26, a data format, depending on the storage region.

The apparatus controller 2 according to the embodiment can convert the accumulated operation information stored in the existing data format as indicated in FIG. 4 into accumulated operation information in the data format for use in the embodiment as indicated in FIG. 5. Moreover, the apparatus controller 2 can also convert the operation information piece stored in the data format in the embodiment into operation information piece in the existing data format. In the following, conversion from the existing data format into the data format in the embodiment may also be referred to as first conversion, and conversion from the data format in the embodiment into the existing data format may also be referred to as second conversion.

The first conversion is effective in preventing the storage region from running out of storage capacity as described above. In contrast, in some cases, the user may easily use the accumulated operation information stored in the existing data format than the accumulated operation information stored in the data format in the embodiment. Thus, the second conversion may be used to improve the usability in the case where the storage capacity of, for example, the storage device 3 or the server 4 is large.

In the first conversion, the data processing module 22 determines whether the values of two records included in the accumulated operation information and adjacent to each other along the time axis are equal to each other or not. In the case where the values of the two records are equal to each other, the data processing module 22 combines the two records into a single record. In this case, the data processing module 22 sets the first date and time and the last date and time in the single record, which is a new record, using information indicating the date and time in each of the two records, which are the original records. The first date and time is the date and time of one of the two records that is associated with an operation information piece earlier received by the apparatus controller 2. In contrast, the last date and time is the date and time of one of the two records that is associated with an operation information piece later received by the apparatus controller 2. The data processing module 22 performs the above process on any adjacent two records in the accumulated operation information and repeats the above process until no two adjacent records having values equal to each other exist. It should be noted that in repetition of the above process, in the case where the first date and time and the last date and time are set in at least one of two adjacent records having values equal to each other, the first date and time and the last date and time is set as follows. The first date and time is the first date and time or the date and time of one of the two records that is associated with the operation information piece earlier received by the apparatus controller 2. The last date and time is the last date and time or the date and time of one of the two records that is associated with the operation information piece later received by the apparatus controller 2. It should be noted that a record in which the last date and time is set to, for example, "NULL", "0", or the first date and time includes a value different from the value of its adjacent record, and thus such a combining process as described above is not performed thereon.

In the second conversion, the apparatus controller 2 converts accumulated operation information as indicated in FIG. 5 into accumulated operation information as indicated in FIG. 4. In this case, the data processing module 22 determines whether the time from the first date and time to the last date and time in a record is longer than a unit time or not. It should be noted that the unit time is, for example, time intervals at which the apparatus controller 2 acquires an operation information piece from the apparatus 1 and is, for example, 30 minutes or 1 hour. In the case where the time from the first date and time to the last date and time is longer than the unit time, the data processing module 22 divides the record. Specifically, in the case where the time from the first date and time to the last date and time is N times longer than the unit time, the data processing module 22 divides the record into N records. It should be noted that N in this case is a natural number. The data processing module 22 sets, using the first date and time and the last date and time, dates and times in the records obtained by division.

A data format conversion process may be automatically performed when the version of software in the apparatus 1, the apparatus controller 2, the storage device 3, or the server 4 is converted, or may also be manually performed by the user of the apparatus controller 2 through the input module 26.

Figure 10:
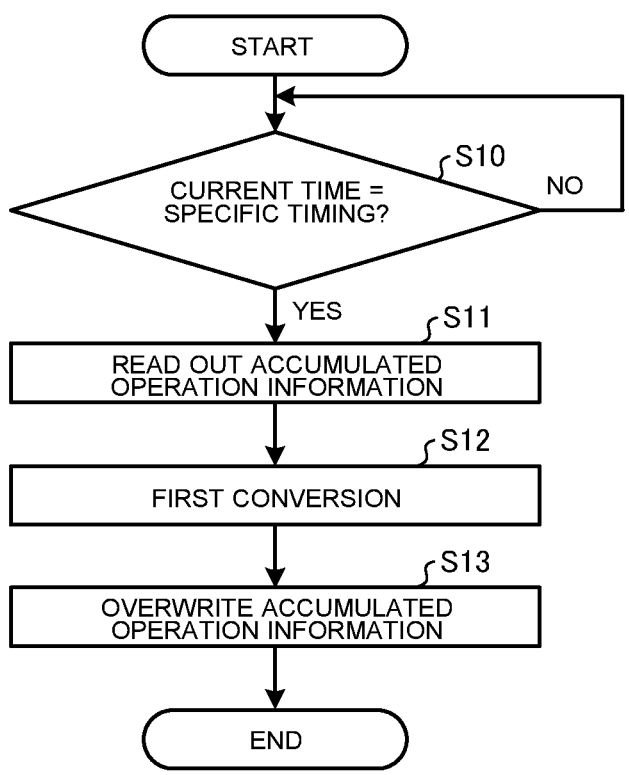
FIG. 10 is a flow chart illustrating data format conversion process according to the embodiment.

FIG. 10 is a flow chart indicating the data format conversion process according to the embodiment. It is assumed that the conversion processing as indicated in FIG. 10 is automatically performed at specific. The specific timing is, for example, timing at which an application for the data format conversion process is started or periodic timing. The periodic timing is optional timing which the software of the apparatus controller 2 can recognize, such as timing at which the date changes, timing at which the week changes, or timing at which the month changes.

FIG. 10 indicates by way of example the case where the first conversion is performed on the accumulated operation information stored in the storage module 23; however, the storage module 23 in the above case may be replaced by the storage device 3 or the server 4. In this case, the apparatus controller 2 performs the first conversion on the accumulated operation information stored in the storage device 3 or the server 4 in place of the accumulated operation information in the storage module 23. It should be noted that regarding the example indicated in FIG. 10, instead of the first conversion, the second conversion may be performed. In this case, the accumulated operation information in the data format in the embodiment is converted into the accumulated operation information in the existing data format.

In step S10, the controller 20 determines whether or not the current time is specific timing. When the current time is not the specific timing (NO in step S10), the controller 20 causes the processing to return to step S10. When the current time is the predetermined timing (YES in step S1), in step S11, the data processing module 22 reads out, in response to a command from the controller 20, the accumulated operation information stored in the storage module 23. In step S12, the data processing module 22 performs the first conversion on the read-out accumulated operation information.

In step S13, the controller 20 overwrites the accumulated operation information stored in the storage module 23 with the accumulated operation information obtained by the first conversion performed by the data processing module 22. After the process of step S13, the apparatus controller 2 ends the data format conversion process.

Figure 11:
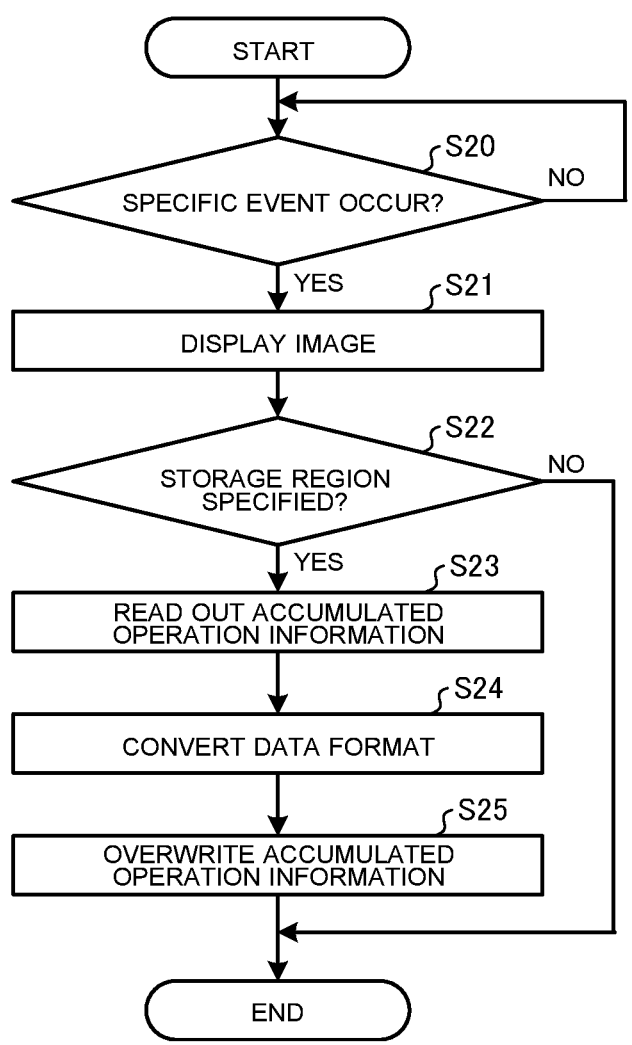
FIG. 11 is a diagram indicating a data format conversion process that is performed by specifying a storage region to be subjected to data format conversion.

The apparatus controller 2 according to the embodiment enables the user to specify a storage region for which data format conversion is to be performed. That is, the apparatus controller 2 enables the user to specify which of storage regions of the storage module 23, the storage device 3, and the server 4 is a storage region which stores accumulated operation information to be subjected to data format conversion. FIG. 11 is a diagram indicating a data format conversion process that is performed by specifying a storage region to be subjected to data format conversion.

In step S20, the controller 20 determines whether or not a specific event occurs. It should be noted that the specific event may be, for example, an event in which specific timing is set as described with reference to FIG. 10 or an event in which the input module 26 receives a command to convert the data format that is given from the user. When the specific event does not occur (No in step S20), the controller 20 causes the processing to return to step S20.

When the specific event occurs (YES in step S20), in step S21, the controller 20 controls the display module 25 to display a screen image that requests the user to select a storage region to be subjected to data format conversion process. In step S22, the controller 20 determines whether or not the user specifies a storage region using the input module 26. When a storage region is not specified within a predetermined time period (NO in step S22), the controller 20 ends the data format conversion process by the apparatus controller 2. When a storage region is specified within the predetermined time period (YES in step S22), in step S23, the data processing module 22 reads out, in response to a command from the controller 20, accumulated operation information from the specified storage region. It should be noted that in the case where the specified storage region is a storage region in the storage device 3 or the server 4, the data processing module 22 reads out, through the second communication module 24, an operation information piece from the storage device 3 or the server 4.

In step S24, the data processing module 22 converts the data format of the read-out accumulated operation information. In step S25, the controller 20 overwrites the accumulated operation information stored in the storage region specified in step S22 with the accumulated operation information obtained by data format conversion by the data processing module 22. It should be noted that instead of overwriting the accumulated operation information, the controller 20 may cause the specified storage region to store the accumulated operation information subjected to the conversion information together with the accumulated operation information that has not yet been subjected to the conversion. After the process of step S25, the controller 20 ends the data format conversion process by the apparatus controller 2.

In step S22 in the above conversion process, the apparatus controller 2 may allow the data format in the specified storage region to be specified. Moreover, in step S22, the apparatus controller 2 may further accept, for example, specification of the address of an apparatus 1 or a data item for which the data format is to be converted, in addition to specification of the storage region for which the data format is to be converted. As a result, the apparatus controller 2 can perform data format conversion in more detail.

Figure 12:
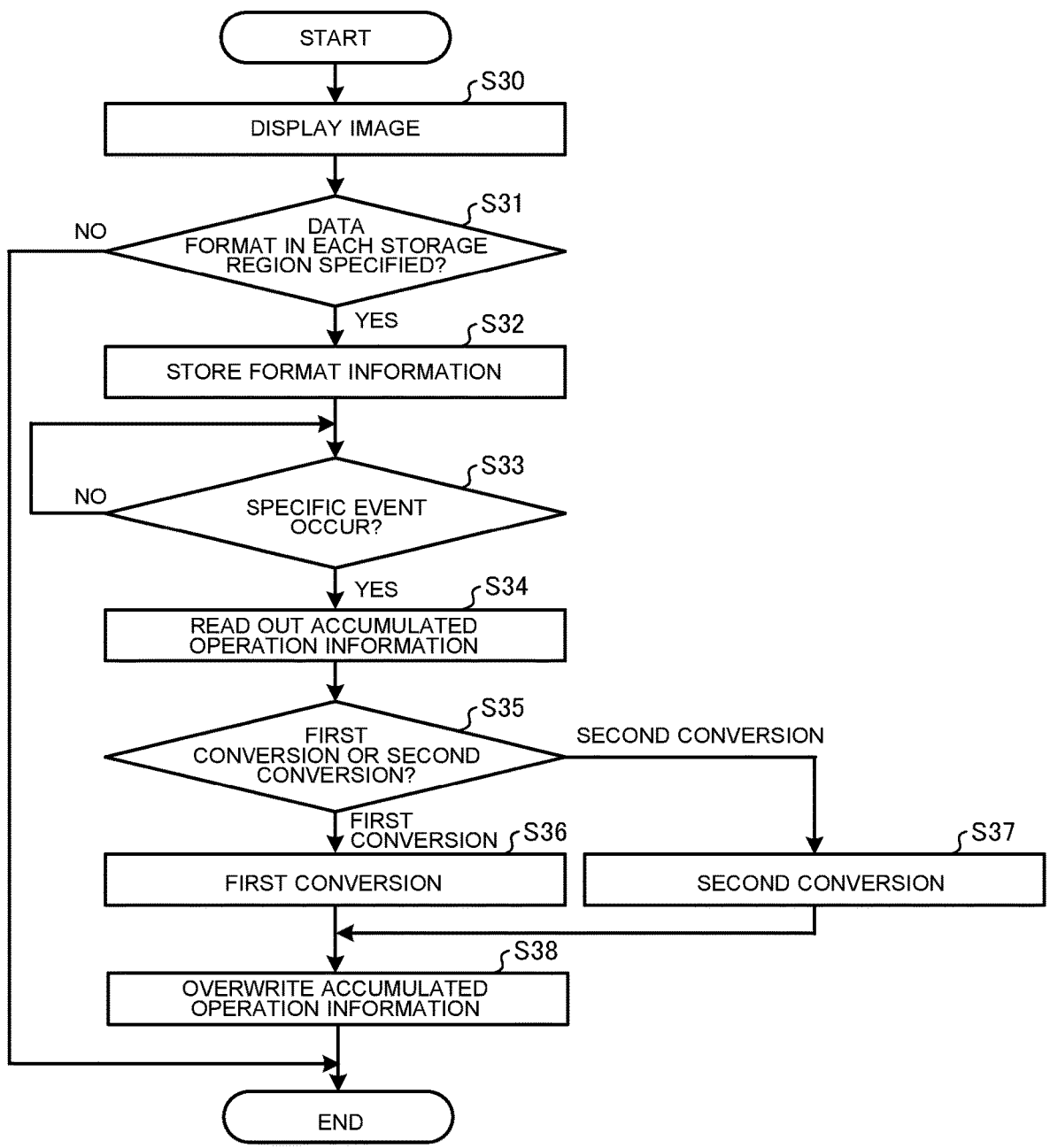
FIG. 12 is a diagram indicating an example of a convert process to convert the data format of accumulated operation information to a specified data format.

The apparatus controller 2 may also allow the user to specify a data format. FIG. 12 is a diagram illustrating a process to convert the data format of the accumulated operation information to a specified data format. It should be noted that regarding FIG. 12, the following description is made by referring to the case where a data format is specified prior to the data format conversion process.

In step S30, the controller 20 controls the display module 25 to display a screen image that requests the user to select which of the first conversion and the second conversion is to be performed on the accumulated operation information stored in each of the storage module 23, the storage device 3, and the server 4. In step S31, the controller 20 determines whether or not the data format of the accumulated operation information in each of the above storage regions is specified by the user through the input module 26 within a predetermined time period. When the specification is not performed within the predetermined time period (NO in step S31), the controller 20 ends the data format conversion process by the apparatus controller 2. When the specification is performed within the predetermined time period (YES in step S31), in step S32, the controller 20 causes the storage module 23 to store information indicating the specified data format of the accumulated operation information in each storage region. It should be noted that in the following, the information indicating the specified data format may also be referred to as format information.

In step S33, the controller 20 determines whether or not a specific event for the data format conversion occurs. When the specific event does not occur (NO in step), the controller 20 causes the processing to return to step S33.

When the specific event occurs (step S33: YES), in step S34, the data processing module 22 reads out, from the storage regions storing the accumulated operation information to be subjected to data format conversion, the accumulated operation information in response to a command from the controller 20. It should be noted that in the following, the accumulated operation information to be subjected to data format conversion may also be referred to as target accumulated operation information, and a storage region to store the target accumulated operation information may also be referred to as a target storage region.

In step S35, the controller 20 determines whether to perform the first conversion or the second conversion on the target accumulated operation information. It should be noted that the controller 20 makes the above determination in step S35 using the format information that is stored in the storage module 23 in step S31.

In step S35, when the controller 20 determines that the first conversion is to be performed on the target accumulated operation information (step S35), in step S36, the data processing module 22 performs the first conversion on the target accumulated operation information in response to a command from the controller 20. After the process of step S36, the controller 20 causes the processing to proceed to step S38.

In step S35, when the controller 20 determines that the second conversion is to be performed on the target accumulated operation information (step S35), in step S37, the data processing module 22 performs the second conversion on the target accumulated operation information in response to a command from the controller 20. After the process of step S37, the controller 20 causes the processing to proceed to step S38.

In step S38, the controller 20 overwrites the accumulated operation information stored in the target storage regions with the target accumulated operation information obtained through the data format conversion by the data processing module 22. It should be noted that instead of overwriting the accumulated operation information, the controller 20 may cause the target storage region to store the accumulated operation information that has been subjected to the conversion, together with the accumulated operation information that has not yet been subjected to the conversion. After the process of step S38, the controller 20 ends the data format conversion process by the apparatus controller 2.

The above processing as indicated in FIG. 12 may be performed from step S33 in the case where the format information has already been stored. It should be noted that the case where the format information has already been stored corresponds to, for example, the case where processes up to step S32 have already been performed.

The above target accumulated operation information may be information based on which the specific event in step S33 is determined. For example, in the case where the specific event is an event in which the timing of data format conversion for the storage module 23 has come, it is determined that the target storage region is the storage module 23, and that the target accumulated operation information is the accumulated operation information stored in the storage module 23. Alternatively, the target accumulated operation information may be determined, between steps S33 and S34, by performing the processes of steps S21 and S22 as indicated in FIG. 11. In the case where the processes of steps S21 and S22 of FIG. 11 are performed between steps S33 and S34, the user may be prompted to re-specify the data format, even when the format information is stored at the stage of carrying out the process of step S22.

Regarding the embodiment, it is described above by way of example that a plurality of records having values equal to each other are combined into a single record. A determination process by the data processing module 22 regarding whether or not the values of two records coincide with each other will be further described in more detail. Regarding the determination whether two values coincide with each other, when the difference between the two values is less than or equal to a predetermined threshold, the data processing module 22 may determine that the two values coincide with each other. For example, in the case where the apparatus 1 is an air-conditioning apparatus, it can be assumed that the energy consumption of the air-conditioning apparatus is constant at nighttime in which air-conditioning processing is not performed or in a specific first time period, such as a season, for example, spring or autumn, in which it is less likely that the air-conditioning apparatus is operated. It should be noted that a slight error may be made between values of two energy consumptions of the apparatus controller 2, which are successively obtained, due to, for example, an external influence. In this case, a threshold may be determined in advance as an upper limit of an error range in the apparatus controller 2. In the first time period, even when the current value is different from the previous value, in the case where the difference between the previous value and the current value is less than or equal to the threshold, in step S4 described above with reference to FIG. 6, the data processing module 22 may determine that both the values are equal to each other. The data processing module 22 may then combine a record including the previous value and a record including the current value into a single record. As a result, the apparatus controller 2 can further reduce data usage.

It should be noted that the threshold may be determined based on the temporal transition of power, or may be determined by, for example, artificial intelligence (AI) based on, for example, a power track record, outside air temperatures, or room temperatures which were obtained one year ago or during one year or a few months.

The first time period may be determined based on the rate at which the apparatus 1 is made in the stopped state, and which is indicated in the past track record. In this case, the first time period may be a time period in which the rate at which the apparatus 1 is made in the stopped state is higher than or equal to a predetermined first rate. Alternatively, the first time period may be, for example, a time zone such as nighttime or early morning in the case where the apparatus 1 is installed in an office building. Moreover, in the case where the apparatus 1 is an air-conditioning apparatus, the first time period may be determined from a specific time range in which the frequency of use of the apparatus 1 is low in spring or autumn.

In such a time period as described, it may be determined that the values of two records may coincide with each other, even when the values are different from each other. In contrast, in such a time period as described below, it may be determined that the values of two records are different from each other, even when the values coincide with each other. For example, in a time period in which the value of energy consumption greatly changes, two values of energy consumption of the apparatus controller 2, which are successively obtained, may become accidentally equal to each other. In such a manner, in the case where the successively obtained two values of energy consumption become accidentally equal to each other, the apparatus controller 2 may be made not to combine records including the respective two values into a single record. In the case where the successively obtained two values become accidentally equal to each other, for example, during daytime in which air-conditioning processing is performed or in a season such as summer or winter in which it is more likely that air-conditioning apparatuses are in operation, the apparatus controller 2 may be made not to combine the two values into a single record and may cause each of records to include an associated one of the two values. That is, the apparatus controller 2 may cause each of the records to include an associated one of the successively obtained two values in a specific second time period. The second time period may be determined later based on, for example, changes in energy consumption for the day, changes in energy consumption for a few months or one year. For example, the second time period may be determined based on the rate at which the apparatus 1 is made in the operation state. In this case, the second time period may be a time period in which the rate at which the apparatus 1 is made in the operation state is higher than or equal to a predetermined second rate. Moreover, the second time period may be estimated by AI or may be determined by AI based on, for example, changes in energy consumption for a few months or one year.

It will be described what advantages are obtained by the apparatus controller 2 and the apparatus control system 100 according to the embodiment. The apparatus controller 2 according to the embodiment includes the first communication module 21, the storage module 23, the data processing module 22, and the controller 20. The first communication module 21 receives from each of one or more apparatuses 1, an operation information piece that indicates the state of the apparatuses 1. The storage module 23 stores operation information pieces in a cumulative manner. The data processing module 22 produces, in the case where values indicated by a plurality of operation information pieces successively received from the apparatus 1 by the first communication module 21 are equal to each other, combined operation information that is a combination of the plurality of operation information pieces. The controller 20 controls the first communication module 21 and the data processing module 22, and also causes, in the case where the data processing module 22 produces the combined operation information, the storage module 23 to store the combined operation information instead of the plurality of operation information pieces. In the case where the operation state of the apparatus 1 does not change, the data processing module 22 combines the plurality of operation information pieces acquired by the first communication module 21 into combined operation information, and the controller 20 causes the storage module 23 to store the combined operation information instead of the plurality of operation information pieces, thereby reducing the amount of data to be stored. Therefore, a sufficient storage capacity is ensured.

The data processing module 22 is configured as follows. In the case where the first communication module 21 successively receives from the apparatus 1, a plurality of operation information pieces indicating values equal to each other, the data processing module 22 according to the embodiment sets, in the first combined operation information, the reception date and time of a first one of the plurality of operation information pieces, which is first received by the first communication module 21, as the first date and time. Furthermore, the data processing module 22 sets, in the combined operation information, the reception date and time of a last one of the plurality of operation information pieces, which is last received by the first communication module 21, as the last date and time. The combined operation information is obtained by combining a plurality of operation information pieces obtained in a time period in which the operation state does not change. By setting in the combined operation information, information indicating the time period, the apparatus controller 2 can store accumulated operation information accurately indicating the temporal transition of the operation state, while reducing the amount of data.

Furthermore, in the case where the values indicated by the plurality of operation information pieces successively received from the apparatus 1 by the first communication module 21 are equal to each other, the data processing module 22 according to the embodiment combines the plurality of operation information pieces upon occurrence of a specific event. Since the plurality of operation information pieces in the accumulated operation information are combined upon occurrence of the specific event, the workload of the apparatus controller 2 can be reduced at normal times that are times other than the time of occurrence of the specific event. Thus, at normal times, the efficiency of other operations by the apparatus controller 2 is improved. Moreover, at the time of occurrence of the specific event, the amount of data in the storage module 23 can also be reduced since the plurality of operation information pieces are combined.

When the combined operation information is stored in the storage module 23 and a specific event occurs, the data processing module 22 according to the embodiment converts the combined operation information into the plurality of operation information pieces. When the data processing module 22 converts the combined operation information into the plurality of operation information pieces, the controller 20 causes the storage module 23 to store the plurality of operation information pieces instead of the combined operation information. The data processing module 22 converts the combined operation information back to the plurality of operation information pieces, whereby the apparatus controller 2 can provide accumulated operation information which is user-friendly. Moreover, since data format conversion is performed upon occurrence of a specific event, the workload of the apparatus controller 2 can be reduced at normal times that is time other than the time of occurrence of the specific event. Thus, at normal times, the efficiency of other operations by the apparatus controller 2 is improved.

The apparatus controller 2 according to the embodiment further includes the input module 26 that receives an input command. The specific event may be an event in which the input module 26 receives a command for conversion of the data format of operation information stored in the storage module 23. As a result, the user can obtain accumulated operation information in a necessary data format at a necessary timing. Moreover, when a command for conversion of the data format is not input to the input module 26, a process by the apparatus controller 2 to convert the data format is not performed, and the speed of other processes by the apparatus controller 2 can thus be maintained. It is therefore possible to improve the usability of the apparatus controller 2 for the user.

The specific event according to the embodiment may be an event in which a predetermined time elapses or an event in which an application for conversion of the data format of the operation information pieces stored in the storage module 23 is started. Therefore, the workload of the apparatus controller 2 can be reduced at any time except time at which the specific event occurs. It is therefore possible to improve the efficiency of other operations by the apparatus controller 2.

The data processing module 22 according to the embodiment is configured as follows. When the difference between the value indicated by a firstly received one of successive operation information pieces from the apparatus 1 and the value indicated by each of all remaining ones of the successive operation information pieces that are other than the firstly received operation information piece is less than or equal to the threshold, the data processing module 22 combine the successive operation information pieces. The apparatus controller 2 combines the successive operation information pieces when the temporal transition of the operation information falls within an error range. Thus, the amount of data in the storage module 23 can be reduced.

Also, the data processing module 22 according to the embodiment is configured as follow. In the first time period, when the differences between the value indicated by a firstly received one of the successive operation information pieces from the apparatus 1 and the value indicated by each of all remaining ones of the successive operation information pieces that are other than the firstly received operation information piece is less than or equal to the threshold, the data processing module 22 combines the successive operation information pieces. The apparatus controller 2 combines operation information pieces whose transition falls within the error range in the predetermined time period. Thus, the apparatus controller 2 can accurately store information indicating fine changes in operation information in time other than the first time period.

The first time period according to the embodiment is a time period in which the rate at which the apparatus 1 is made in the stopped state is higher than or equal to the predetermined first rate. Therefore, the apparatus controller 2 combines and then stores operation information pieces, for example, in a time period in which the apparatus 1 is not used, and thus the amount of data in the storage module 23 can be reduced. The apparatus controller 2 can cause the storage module 23 to store the accumulated operation information indicating fine changes in operation information in a time period in which the rate at which the apparatus 1 is operated is high and which is other than the first time period.

The data processing module 22 according to the embodiment does not combine, in the predetermined second time period, successive operation information pieces from the apparatus 1, even when the values indicated by the successive operation information pieces are equal to each other. As a result, the apparatus controller 2 causes the accumulated operation information to include, as individual records, a plurality of operation information pieces having values that are accidentally equal to each other, and the apparatus controller 2 can thus provide user-friendly accumulated operation information to the user.

The second time period according to the embodiment is a time period in which the rate at which the apparatus 1 is operated is higher than or equal to a predetermined second rate. Therefore, for example, in a time period in which the frequency of use of the apparatus 1 is high, the apparatus controller 2 does not combine a plurality of operation information pieces indicating values that are accidentally to each other, and stores the plurality of operation information pieces that are not combined. Thus, the apparatus controller 2 can provide user-friendly accumulated operation information. In time other than the second time period, the apparatus controller 2 combines and then stores a plurality of operation information pieces having values equal to each other, and thus the amount of data in the storage module 23 can be reduced.

The apparatus control system 100 according to the embodiment includes the one or more apparatuses 1, the one or more external devices, and the apparatus controller 2. The apparatus controller 2 includes the first communication module 21, the storage module 23, the data processing module 22, the second communication module 24, and the controller 20. The first communication module 21 receives from the one or more apparatuses 1, operation information pieces indicating the operation states of the one or more respective apparatuses 1. The storage module 23 stores the operation information pieces in a cumulative manner. The data processing module 22 produces, when values indicated by a plurality of operation information pieces that are successively received from the apparatus 1 by the first communication module 21 are equal to each other, combined operation information that is a combination of the plurality of operation information pieces. The second communication module 24 communicates with the one or more external devices. The controller 20 controls the first communication module 21, the data processing module 22, and the second communication module 24. The one or more external devices receive the operation information pieces from the apparatus controller 2 and store the operation information pieces. The controller 20 causes, when the data processing module 22 produces the combined operation information, at least one of the one or more external devices and the storage module 23 to store the combined operation information instead of the plurality of operation information pieces. In the apparatus control system 100, the apparatus controller 2 combines into combined operation information, a plurality of operation information pieces obtained in the case where the operation state of the apparatus 1 does not change, and causes at least one of the one or more external devices and the storage module 23 to store the combined operation information instead of the plurality of operation information pieces. As a result, the total amount of data stored in the apparatus control system 100 is reduced. Thus, a storage capacity of the entire apparatus control system 100 can be ensured.

The apparatus controller 2 according to the embodiment further includes the input module 26 that receives an input from the outside. The input module 26 receives data indicating which storage region of the one or more external devices and the storage module 23 is specified. The controller 20 rewrites the above plurality of operation information pieces in the specified storage region to change it into combined operation information. As a result, the user can ensure, as needed, a capacity of any storage region.

The apparatus controller 2 according to the embodiment further includes the input module 26 that receives an input from the outside. The input module 26 receives data indicating which storage region in the one or more external devices and the storage module 23 is specified. The controller 20 rewrites the above combined operation information in the specified storage region to change it into the above plurality of operation information pieces. As a result, the user can store, as needed, accumulated operation information indicating more detailed temporal changes of the operation state of the apparatus 1 in any storage region. Thus, the usability of the apparatus control system 100 is improved.

The apparatus controller 2 according to the embodiment further includes the input module 26 that receives an input from the outside. The input module 26 receives data indicating which data formation is specified as the data format of each of operation information pieces to be stored in the one or more external devices and the storage module 23. The controller 20 causes each of the one or more external devices and the storage module 23 to store an associated one of the operation information pieces in accordance with the specified data format. As a result, the apparatus controller 2 can cause, for example, the storage module 23 to store the accumulated operation information including the combined operation information and can cause the storage device 3 or the server 4 to store the accumulated operation information in the existing data format. Thus, the apparatus control system 100 can maintain usability while reducing the total amount of data to be stored.

The invention claimed is:

1. An apparatus controller comprising:
a first communication circuitry configured to receive from each of one or more apparatuses, an operation information piece indicating an operation state of the apparatus;
a memory configured to store the operation information piece and store operation information pieces in a cumulative manner;
a data processing circuitry configured to produce, when values indicated by a plurality of operation information pieces which are successively received from the apparatus by the first communication circuitry are equal to each other, combined operation information that is a combination of the plurality of operation information pieces; and a controller configured to control the first communication circuitry and the data processing circuitry and also cause, when the data processing circuitry produces the combined operation information, the memory to store the combined operation information instead of the plurality of operation information pieces.

2. The apparatus controller of claim 1, wherein the data processing circuitry is configured to set in the combined operation information, when the first communication circuitry successively receives from the apparatus, the plurality of operation information pieces indicating values equal to each other, a date and time of reception of a first one of the plurality of operation information pieces, at which the first operation information piece is received by the first communication circuitry, as a first date and time, and also set, in the combined operation information, a date and time of reception of a last one of the plurality of operation information pieces, at which the last operation information piece is received by the first communication circuitry, as a last date and time.

3. The apparatus controller of claim 1, wherein the data processing circuitry is configured to combine, when the values indicated by the plurality of operation information pieces successively received from the apparatus by the first communication circuitry are equal to each other, the plurality of operation information pieces upon occurrence of a specific event.

4. The apparatus controller of claim 1, wherein
the data processing circuitry is configured to convert, when the combined operation information is stored in the memory and a specific event occurs, the combined operation information into the plurality of operation information pieces, and
the controller is configured to cause, when the data processing circuitry converts the combined operation information into the plurality of operation information pieces, the memory to store the plurality of operation information pieces instead of the combined operation information.

5. The apparatus controller of claim 3, further comprising an input device configured to receive an input command,
wherein the specific event is an event in which the input device receives the command, which is a command for conversion of a data format of the operation information pieces stored in the memory.

6. The apparatus controller of claim 3, wherein the specific event is an event in which a predetermined time elapses or an application for conversion of a data format of the operation information pieces stored in the memory is started.

7. The apparatus controller of claim 1, wherein the data processing circuitry is configured to combine the plurality of operation information pieces, when a difference between a value indicated by a firstly received one of the plurality of operation information pieces successively received from the apparatus and a value indicated by each of all remaining ones of the plurality of operation information pieces that are other than the firstly received information piece, is less than or equal to a threshold.

8. The apparatus controller of claim 7, wherein the data processing circuitry is configured to combine the plurality of operation information piece, in a predetermined first time period when a difference between a value indicated by the firstly received one of the plurality of operation information pieces successively received from the apparatus and a value indicated by each of all remaining ones of the plurality of operation information pieces that are other than the firstly received information piece is less than or equal to a threshold.

9. The apparatus controller of claim 8, wherein the first time period is a time period in which a rate at which the apparatus is made in a stopped state is higher than or equal to a predetermined first rate.

10. The apparatus controller of claim 1, wherein the data processing circuitry is configured not to combine the plurality of operation information pieces, in a predetermined second time period, even when values indicated by the plurality of operation information pieces successively received from the apparatus are equal to each other.

11. The apparatus controller of claim 10, wherein the second time period is a time period in which a rate at which the apparatus is operated is higher than or equal to a predetermined second rate.

12. The apparatus controller of claim 1, wherein the apparatus is an air-conditioning apparatus.

13. The apparatus controller of claim 1, wherein the operation information piece is information that indicates energy consumption of the apparatus.

14. An apparatus control system comprising: one or more apparatuses; one or more external devices; and an apparatus controller configured to control each of the one or more apparatuses,
wherein the apparatus controller includes
a first communication circuitry configured to receive from each of the one or more apparatuses, operation information indicating an operation state of the apparatus,
a memory configured to store the operation information piece and store operation information prices in a cumulative manner,
a data processing circuitry configured to produce, when values indicated by a plurality of ones of operation information pieces that are successively received from the apparatus by the first communication circuitry are equal to each other, combined operation information that is a combination of the plurality of operation information pieces,
a second communication module configured to communicate with the one or more external devices, and
a controller configured to control the first communication circuitry, the data processing circuitry, and the second communication module, and
wherein the one or more external devices receive the operation information piece from the apparatus controller and store the operation information piece, and
wherein the controller is configured to cause at least one of the one or more external devices and the memory to store the combined operation information instead of the plurality of operation information pieces, when the data processing circuitry produces the combined operation information.

15. The apparatus control system of claim 14, wherein
the apparatus controller further includes an input device configured to receive an input from the outside,
wherein
the input device is configured to receive an input that specifies any one of storage regions of the one or more external devices and the memory, and the controller is configured to rewrite a plurality of operation information pieces in the specified storage region to convert the plurality of operation information pieces into the combined operation information.

16. The apparatus control system of claim 14, wherein the apparatus controller further includes
an input device configured to receive an input from the outside,
wherein
the input device is configured to receive an input that specifies any one of storage regions of the one or more external devices and the memory, and
the controller is configured to rewrite the combined operation information in the specified storage region to convert the combined operation information into the plurality of operation information pieces.

17. The apparatus control system of claim 14, wherein the apparatus controller further includes
an input device configured to receive an input from the outside,
wherein
the input device is configured to receive an input that specifies a data format of each of operation information pieces stored in the one or more external devices and the memory, and
the controller is configured to cause each of the one or more external devices and the memory to store the operation information piece in the specified data format.

\* \* \* \* \*